US012621373B2

(12) United States Patent
Gal

(10) Patent No.: US 12,621,373 B2
(45) Date of Patent: May 5, 2026

(54) PARTIALLY CONNECTED DEVICES

(71) Applicant: SIGNIFY HOLDING B.V., Eindhoven (NL)

(72) Inventor: Jean-Philippe Roland Gal, Hong Kong (HK)

(73) Assignee: SIGNIFY HOLDING B.V., Eindhoven (NL)

( * ) Notice: Subject to any disclaimer, the term of this patent is extended or adjusted under 35 U.S.C. 154(b) by 45 days.

(21) Appl. No.: 18/850,664

(22) PCT Filed: Mar. 23, 2023

(86) PCT No.: PCT/EP2023/057577
§ 371 (c)(1),
(2) Date: Sep. 25, 2024

(87) PCT Pub. No.: WO2023/186713
PCT Pub. Date: Oct. 5, 2023

(65) Prior Publication Data
US 2025/0220090 A1     Jul. 3, 2025

(30) Foreign Application Priority Data

Mar. 29, 2022     (EP) ..................................... 22164934

(51) Int. Cl.
| | |
|---|---|
| *H04L 69/08* | (2022.01) |
| *H04L 12/28* | (2006.01) |
| *H04L 67/104* | (2022.01) |
| *H04L 69/18* | (2022.01) |
| *H04W 72/30* | (2023.01) |

(52) U.S. Cl.
CPC .......... *H04L 69/08* (2013.01); *H04L 12/2803* (2013.01); *H04L 67/104* (2013.01); *H04L 69/18* (2013.01); *H04W 72/30* (2023.01)

(58) Field of Classification Search
CPC ....... H04L 69/08; H04L 69/085; H04L 69/18; H04L 12/2803
See application file for complete search history.

(56) References Cited

U.S. PATENT DOCUMENTS

| | | | | |
|---|---|---|---|---|
| 10,045,216 B1 * | 8/2018 | Indurkar | ............. | H04W 12/068 |
| 2004/0090924 A1 * | 5/2004 | Giaimo | ................. | H04W 40/00 |
| | | | | 370/252 |
| 2007/0105542 A1 * | 5/2007 | Friedman | ................ | H04W 4/00 |
| | | | | 455/420 |
| 2007/0169080 A1 * | 7/2007 | Friedman | ................. | G06F 8/65 |
| | | | | 717/168 |
| 2013/0083722 A1 | 4/2013 | Bhargava et al. | | |

(Continued)

FOREIGN PATENT DOCUMENTS

| | | | |
|---|---|---|---|
| CN | 104202831 A | * | 12/2014 |
| EP | 3955642 A1 | | 2/2022 |

(Continued)

*Primary Examiner* — Kostas J Katsikis

(57) ABSTRACT

Devices, systems, and methods are disclosed herein, which provide an improved way of providing operating instructions to devices such as IoT devices. The disclosure allows for an essentially unlimited number of devices to be controlled via a wireless network. The disclosure does not require pre-planning of the network architecture, nor does it require the number of control devices and end devices to be manually managed or maintained.

15 Claims, 2 Drawing Sheets

(56)                    References Cited

U.S. PATENT DOCUMENTS

| 2017/0048785 | A1 | 2/2017 | Ge et al. |
| 2017/0289812 | A1 | 10/2017 | Werb |
| 2019/0364510 | A1 | 11/2019 | Bonazzoli et al. |
| 2025/0220090 | A1* | 7/2025 | Gal ........................ H04W 72/30 |

FOREIGN PATENT DOCUMENTS

| TW | 201532468 | A | * | 8/2015 | ............ H04W 48/20 |
| WO | 2018237398 | A1 | | 12/2018 | |
| WO | 2021069357 | A1 | | 4/2021 | |

* cited by examiner

PARTIALLY CONNECTED DEVICES

CROSS-REFERENCE TO PRIOR APPLICATIONS

This application is the U.S. National Phase application under 35 U.S.C. § 371 of International Application No. PCT/EP2023/057577, filed on Mar. 23, 2023, which claims the benefit of European Patent Application No. 22164934.6, filed on Mar. 29, 2022. These applications are hereby incorporated by reference herein.

TECHNICAL FIELD

The present disclosure relates to managing devices using a combination of wireless networks and direct device-to-device communication.

BACKGROUND

Smart devices are devices such as light bulbs, smart plugs, switches etc. that can be controlled remotely via a device such as a smart phone. Such devices may be referred to as Internet of Things (IoT) devices. IoT devices are devices that comprise at least one component (such as a light bulb or an actuator, for example) that is remotely operable via operating instructions. Operating instructions may be delivered, for example, wirelessly over a wireless network.

United States patent application US2013/0083722 A1 discloses a method of extending the coverage area of a cellular network for enabling a user of a wireless device to control an electrical appliance such as a light. To this end it is proposed to have the wireless device (e.g. a cellular telephone) communicate with a base station in a cell of a cellular network over a noncellular interface via another wireless device in the cell through the use of multi-hopping.

European patent application EP3955642 A1 discloses another method of extending the coverage area of a cellular network where a first user equipment has a relay role and relays communication between a base station and a second user equipment in the cell and when signal conditions change, the reversal of the roles of the user equipment. Also disclosed is the combined role reversal of the user equipment in combination with handover.

A very wide range of IoT devices are available with differing functionality. Many such devices require a connection to the internet in order to be controlled remotely. For example, in use a smart https://www.mobileprocessing.org/ device may be connected to a Wi-Fi network in order to access the internet and to thereby receive operating instructions.

A problem can occur when a user wishes to install a large number of IoT devices in one location, such as, for example, a residential home or an office. Each of these devices generally require an internet connection in order to function. As noted above, this is usually in the form of a wireless connection to a Wi-Fi access point (AP). Consumer grade APs can only maintain connections to a relatively small number of devices simultaneously; a typical maximum number may be 30-50 devices simultaneously. In a small office situation, for example, if 10 employees each have a computer and a smart device each connected to the AP, the AP will be close to the maximum number of connections it can maintain. This could result in a maximum of 5-10 IoT devices being able to connect to the AP without risking a situation where employees can no longer connect their devices.

In a larger office where a large number of lighting devices, switches and plugs need to be connected to the network, it is clear that even enterprise level APs could be unable to maintain a sufficient number of connections to allow all of the IoT devices to maintain an active connection. A technical problem therefore arises regarding how to manage a large number of IoT devices There is a need, therefore, to provide an alternative method for managing IoT devices.

Existing solutions exist, such as the use of a Zigbee network. Zigbee networks use a Zigbee coordinator, which maintains an internet connection (usually via a wireless connection to a Wi-Fi AP) and broadcasts a Zigbee network. End devices are authenticated and connected to the Zigbee network and receive instructions via the network. A Zigbee network is similar to a Wi-Fi network but uses the IEEE 802.15.4 technical standard to define the operation of the low-rate wireless personal area network (LR-WPAN).

SUMMARY

While the existing solutions, such as the Zigbee system discussed above. reduce the number of devices directly connected to the Wi-Fi AP, Zigbee network controllers are themselves also limited in the number of end devices they can simultaneously connect to. Thus, the structure of such a system must be planned in advance to ensure a sufficient number of network controllers are used in order to manage the end devices. Furthermore, care must be taken when adding new devices to the system to make sure that the exiting controllers can maintain the connections.

Devices, systems, and methods are disclosed herein, which provide an improved way of providing operating instructions to devices such as IoT devices. The disclosure allows for an essentially unlimited number of devices to be controlled via a wireless network. The disclosure does not require pre-planning of the network architecture, nor does it require the number of control devices and end devices to be manually managed or maintained.

According to a first aspect disclosed herein, there is provided a first device for use as one of a set of devices, the first device comprising: an application component configured to be operable by a remote operator via one or more operating instructions; a controller; and a wireless interface for connecting to a wireless network using a first wireless communication protocol, and for receiving and transmitting broadcast messages using a second wireless communication protocol.

According to the first aspect, the first device is configured such that, in use, it is able to function interchangeably in either a proxy mode or a client mode in order to receive operating instructions; wherein in the proxy mode, the first device is configured to connect to a wireless network using the first wireless communication protocol such that, in use, operating instructions are received via the connected wireless network using the first wireless communication protocol; and wherein when switching to the client mode, the first device is configured to disassociate from the wireless network using the first wireless communication protocol; wherein in either the proxy mode or the client mode, the first device is configured such that, in use, operating instructions are received via one or more incoming broadcast messages using the second wireless communication protocol.

According to the first aspect, the first device is further configured such that, in use, in response to receiving an operating instruction using either the first wireless communication protocol or the second wireless communication protocol, the operating instruction is transmitted onwards by the first device in one or more outgoing broadcast messages using the second wireless communication protocol; and when the first device is operating in the proxy mode, the controller switches the first device to operate in the client mode in response to at least one of: a determination that a threshold number of other devices are connected to the wireless network using the first wireless communication protocol; and the first device having received, using the first wireless communication protocol, an operating instruction addressed to the first device to switch to the client mode.

According to a second aspect disclosed herein, there is provided a corresponding method of operating a first device according to the first aspect.

According to a third aspect disclosed herein, there is provided a system comprising: a device according to the first aspect functioning in the proxy mode; and a device according to the first aspect functioning in the client mode; wherein, in use: the device operating in the proxy mode receives an operating instruction via the connected wireless network using the first wireless communication protocol and, in response to receiving the operating instruction, transmits the operating instruction onwards in one or more outgoing broadcast messages via the second wireless communication protocol; the device operating in the client mode receives, via the second wireless communication protocol, one or more incoming broadcast messages, the one or more incoming broadcast messages corresponding to the one or more outgoing broadcast messages comprising the operating instruction broadcast by the first device via the second wireless communication protocol; and the device operating in the client mode, in response to receiving the operating instruction, transmits the operating instruction onwards in one or more outgoing broadcast messages via the second wireless communication protocol.

According to some embodiments disclosed herein, a device may initially operate in "legacy mode" either as a regular Wi-Fi STA, or alternatively as a Wi-Fi Soft AP. While operating in legacy mode as a STA the device will need to be provisioned, i.e. network credentials will need to be provided that will allow the device to connect to a Wi-Fi AP. The device may operate in legacy mode as a default start-up. For example, a provisioning process, by a user, using a wired access or other customary provisioning process may provide the device with the login credentials required in order to connect to a Wi-Fi AP, such as the basic service set identifier (BSSID) and password of the AP. Alternatively, a device may initially start in a "legacy mode" as a Soft AP, thereby facilitating a provisioning device, such as a mobile phone or a tablet to connect to the Soft AP and communicate. The provisioning device may then provide the network credentials of the Wi-Fi (infrastructure) AP to the device. The provisioning process may thus take place using a Wi-Fi protocol, a Wi-Fi direct protocol or more alternatively using a Bluetooth protocol.

A device operating in legacy mode may switch to operating in proxy/client mode (as described in the above disclosed aspects) in response to an instruction provided from a remote server (for example in the cloud), after being triggered by a user, in response to determining that a threshold number of other devices connected to the Wi-Fi AP are also operating in legacy mode and/or by detecting that within a threshold range one or more other devices are able to operate in proxy/client mode. In case of a Wi-Fi system, by having devices (STAs) switch to client mode and disassociate from the Wi-Fi AP, the number of devices associated to the Wi-Fi AP can be reduced and the second wireless communication protocol may be used to forward operating instructions from the remote operator to client devices.

According to some embodiments disclosed herein, devices operating in client mode may intermittently connect to a wireless network using the first wireless communication protocol in order to download firmware updates. This connection may be triggered after a pre-set period of time has elapsed since the last connection or may be triggered in response to an instruction received from a remote server or from a user. Optionally proxy devices and client devices, or alternatively client devices, may coordinate the times when they join/associate with the first wireless network, so as to avoid having too many devices associate at once, simple solutions may involve a round robin scheme, or time-slot allocation.

According to some embodiments, the first wireless communication protocol is IEEE 802.11 operating in an infrastructure mode, with one or more access points using a basic service set (BSS) or an extended service set (ESS).

According to some embodiments, the second wireless communication protocol is Wi-Fi Direct based, wherein the IEE 802.11 protocol is used with the peer-to-peer extensions from Wi-Fi Direct.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

The following describes a device configured to operate in either a proxy mode or a client mode. A method of operating such a device and a system comprising two or more such devices is also described. By being able to operate interchangeably in either a proxy mode or a client mode, the present disclosure provides a solution wherein the number of devices connected to a wireless network (such as a Wi-Fi network provided by a Wi-Fi AP) can be dynamically changed, without needing to change the number or type of devices in the system. The devices can change between operating in proxy and client mode automatically or in response to instructions transmitted by a remote operator. This solution is advantageous as it allows an almost unlimited number of the devices according to this disclosure to be part of a system of devices, without imposing any requirements on the wireless network or on the type of devices needed within the system.

Figure 1:
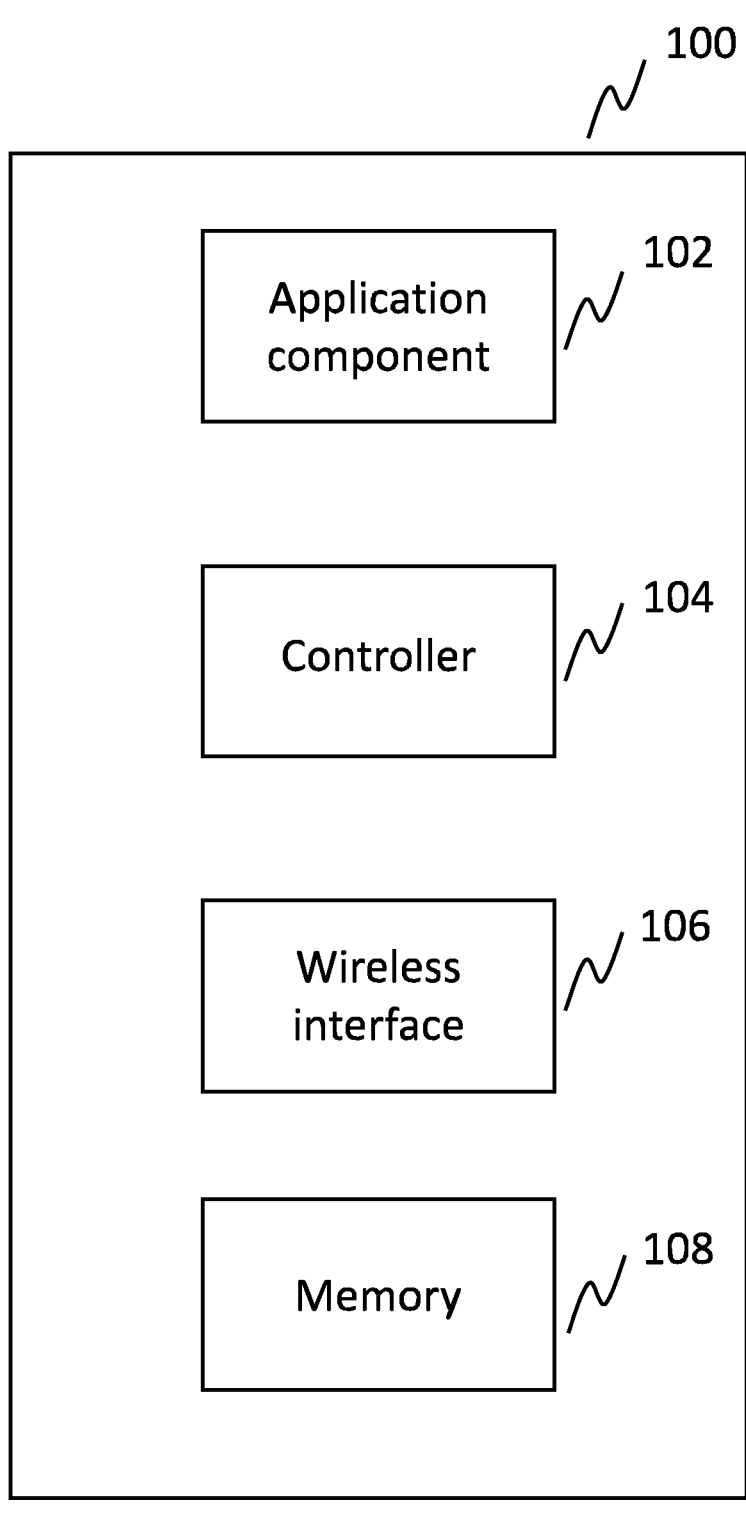
FIG. 1 shows schematically a device according to the present invention.

FIG. 1 illustrates schematically an example of a device 100 according to embodiments disclosed herein. The device 100 comprises an application component 102, a controller 104 and a wireless interface 106. In some examples, the device 100 may further comprise memory 108 configured to store information.

An application component 102 according to the present disclosure is a component that is configured to be operable by a remote operator via one or more operating instructions. In some examples a device may comprise more than one application components 102. The remote operator may for example be a cloud-based control system that manages a network of on-premises application devices installed in a home or office environment. The application components can be for a single application such as a lighting application, comprising controllers (wireless switches), sensors (wireless presence sensors, day-light sensors), and actuators associated with wireless bulbs or wirelessly connected luminaires. The applications however may extend beyond the lighting application and may include for example an HVAC application, a localization application and/or asset tracking application, which may use RF sensing to detect persons or device (asset tracking), a security camera application, a wireless sensor application, a wireless actuator application. The application components may in fact include devices of various applications.

The controller 104 may be one or more computer chips. In some examples the controller 104 may be a computer processor. As discussed in more detail below, in some examples the controller 104 is configured to control the device 100 in order to perform various functions.

The wireless interface 106 is configured to communicate using at least two wireless communication protocols; a first wireless communication protocol and a second wireless communication protocol. The first wireless communication protocol is for connecting to a wireless network, thereby to receive operating instructions from a remote operator. The second wireless communication protocol is for transmitting and receiving broadcast messages, thereby to receive and/or relay operating instructions to/from other devices.

In some examples, the device 100 further comprises memory 108. The memory 108 may be any suitable memory for storing information. The memory 108 may be non-volatile memory, such that information can be retained in the memory 108 even if the device 100 is powered down.

The device 100 is configured to be able to function in a proxy mode or a client mode. While operating in the proxy mode, the device 100 is configured to connect to a wireless network using the wireless interface 106, thereby to receive operating instructions from a remote operator. When switching to operate in the client mode, the device 100 is configured to disassociate from the wireless network such that the device 100 is not connected to a wireless network using the first wireless communication protocol. In some examples, the device 100 may not be connected to a wireless network, for example once it is instructed to operate in client mode and it has disassociated. In such examples, the device 100 is not "connected" or associated to a wireless network, in other words the device does not attempt to transmit packets/messages within the network, and thus cannot disassociate from the wireless network. In such examples, the device 100 instead does not attempt to connect to a wireless network using the first wireless communication protocol.

The device 100, while operating in either the proxy mode or the client mode, is configured to be able to receive operating instructions. While operating in proxy mode, the operating instructions may be received via the wireless network using the first wireless communication protocol or via one or more broadcast messages received using the second wireless communication protocol. While operating in the client mode, the device 100 can only receive operating instructions via one or more broadcast messages received via the second wireless communication protocol. While operating in either mode, when the device 100 receives operating instructions, the device 100 is configured to relay the received operating instructions by transmitting the received operating instructions via one or more broadcast messages using the second wireless communication protocol. The broadcast messages thus represent a form of communication, that allows a reduction of the impact of the application components on the first wireless network resources (such as the number of devices that need to associate to an AP). When in addition the broadcast communications would be done out-of-band, e.g. using a different frequency band and/or channel, or even using a different radio, a further reduction of the impact may be achieved.

The device 100 is configured such that when operating in the proxy mode, the controller 104 switches the device from operating in the proxy mode to operating in the client mode. In some examples, the controller 104 is configured to switch the device in this way in response to a determination that a threshold number of devices connected to the wireless network using the first wireless communication protocol. Additionally, or alternatively, the controller 104 is configured to switch the device in this way in response to the device 100 having received, using the first wireless communication protocol, an operating instruction addressed to the device 100 to switch to the client mode.

In some examples, the determination that a threshold number of devices are connected to the wireless network may be made by the controller 104 of the device. For example, the controller 104 may detect that a number of other devices according to the disclosure are also connected to the wireless network and so one or more of the devices should switch to client mode, such that fewer devices are connected to the wireless network.

In some examples, the determination that a threshold number of devices are connected to the wireless network may be made by a remote operator, such as a server located in the cloud. In some examples, the determination may be made by a user.

Figure 2:
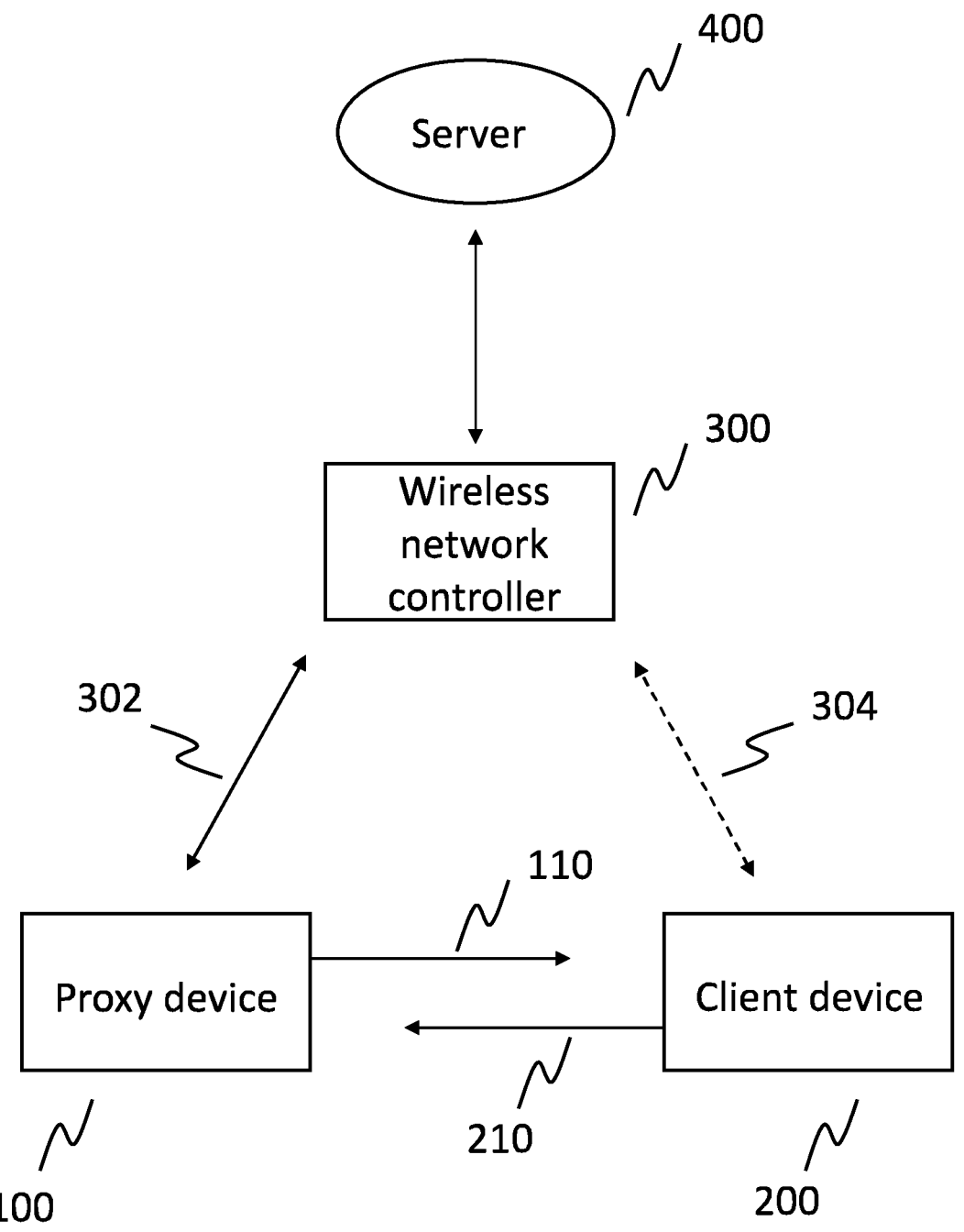
FIG. 2 shows schematically a system according to the present invention, comprising a device operating in the proxy mode and a device operating in the client mode.

FIG. 2 illustrates schematically an example of a system according to embodiments disclosed herein. The system comprises a first device 100 operating in the proxy mode and a second device 200 operating in the client mode. In the illustrated example, the first device 100 may be referred to as the proxy device, the second device 200 may be referred to as the client device. The first device 100 is connected to a wireless network using the first wireless communication protocol. In this example, the wireless network is formed and managed by a wireless network controller 300. A wireless network controller 300 may be, for example, a Wi-Fi wireless access points (WAP). A system according to the present disclosure requires at least one device operating in the proxy mode and at least one device operating in the client mode, however it should be appreciated that the system may comprise any number of additional devices operating in the proxy mode and any number of additional devices operating in the client mode; FIG. 2 merely illustrates only one example of each for simplicity.

As illustrated in FIG. 2, the first device 100 maintains a connection 302 with the wireless network controller 300 using the first wireless communication protocol. The second device 200 does not maintain a connection with the wireless network controller 300. However, as discussed in more detail below, the second device 200 may periodically connect 304 to the wireless network managed by the wireless network controller 300, for example in order to download a firmware update. When connected to the wireless network controller 300, the second device 200 may remain in the client mode (thus not receiving operating instructions via the network controller 300) or may switch to operate in the proxy mode.

In some examples, the connection 302 between the first device 100 and the wireless network controller 300 using the first wireless communication protocol is a wireless local area network formed and managed by the wireless network controller 300. In some examples in order to connect to the wireless network, the first device must request to join the wireless network and then must provide authentication information (for example a password) in order to be granted access to the network. In some examples, when the connection is authenticated, the wireless network controller 300 stores identification information for the first device 100 such that the wireless network controller 300 is aware that the first device 100 has been granted access to the network. Similarly, after being granted access the first device 100 may store in memory 108 such that the device 100 is aware that it is connected to the wireless network. While connected to the wireless network, the device 100 and the wireless network controller 300 may be able to share information in a bi-directional communication link 302 without the need for further authentication. In some examples, after establishing a connection 302 to the wireless network controller 300, the device 100 may establish a secure connection to a remote server 400. In some examples the remote server 400 may be connected to the wireless network controller 300 via a local area network connection, in other examples the remote server 400 may be connected to the wireless network controller via an internet connection. This is discussed in more detail below.

In some examples, when disconnecting from the wireless network (for example, if the first device 100 is switching from proxy mode to client mode) the first device informs the wireless network controller 300 that the first device is disconnecting from the wireless network. In some examples, disconnecting may be referred to as disassociating from the network. In response, the wireless network controller 300 may de-authenticate the device 100, for example by removing the stored information indicating that the device 100 is authenticated. If, at a future point, the device 100 attempts to re-connect to the wireless network using the first wireless communication protocol, the device 100 may need to provide authentication information using the same association procedure as used with devices new to the network, in order to be allowed to re-connect to the wireless network.

In use, the first device 100 receives operating instructions (not shown) transmitted via the wireless network 302 using the first wireless communication protocol. In some examples, the operating instructions may be transmitted from a server 400 connected to the wireless network controller via a network connection and/or via the internet. As discussed above in relation to FIG. 1, when the first device 100 receives operating instructions, the first device 100 is configured to relay the received operating instructions by transmitting the received operating instructions via one or more broadcast messages 110 using the second wireless communication protocol. Also, when the second device 200 receives operating instructions, the second device 200 is configured to relay the received operating instructions by transmitting the received operating instructions via one or more broadcast messages 210 using the second wireless communication protocol.

Further examples of the functionality of devices according to the present disclosure will now be discussed in more detail.

In some examples, an operating instruction may comprise or consist of an application layer command, the application layer command comprising two or more of: on, off and/or power-save.

In some examples, the controller 104 may cause the device 100 to transmit a switching message to the other devices connected to the wireless network. The switching message may allow the devices to coordinate the decision to switch from proxy mode to client mode, so as to prevent all of the devices from switching from proxy mode to client mode (since at least one device must remain connected to the wireless network and functioning in proxy mode in order to relay the operating instructions to the other devices via one or more broadcast messages using the second wireless communication protocol). In some examples, the switching message may cause the other devices to temporarily delay switching modes such that the device 100 can switch from proxy mode to client mode. In such an example, the other devices may re-assess whether the threshold number of devices operating in the proxy mode is still reached after the first device 100 has switched to operating in client mode. In some examples, upon receipt of a switching message when operating in the proxy mode, the device 100 may wait for a time period before determining whether the threshold number of devices is reached. In some examples, this waiting period may be a period of time that is randomly decided between a pre-set upper and lower limit; this is advantageous as it may prevent multiple devices from assessing simultaneously whether the threshold amount has been reached. In other examples, the switching message may inform other devices that the first device 100 will remain in proxy mode and that one of the other devices should instead switch.

In some examples, the threshold number of devices connected to the wireless network operating in the proxy mode may be a pre-set number of devices. In other examples, the threshold number of devices may be determined as a ratio between the number of devices operating in proxy mode and the number of devices that have switched to operating in client mode. In some examples, the ratio of proxy/client devices may be determined by a remote operator, such as a server operating in the cloud.

In some examples, the device may be configured such that the first time the device 100 is switched on, the device must be provisioned. Provisioning involves providing the device 100 with authentication information in order to connect to a wireless network using the first wireless communication protocol. In some examples where the device 100 comprises memory 108, the authentication information may be stored in the memory 108 such that after provisioning, the device is able to connect to the wireless network at any via the first wireless communication protocol, using the access credentials stored in the memory 108.

Provisioning may be undertaken, for example, by a user using a device such as a smart phone. Provisioning may take place using one or more broadcast messages received using the second wireless communication protocol. In some examples, the device 100 may transmit broadcast messages using the second wireless communication protocol in order to inform other devices that the device 100 requires provisioning information. In some examples, the device 100 may be configured to transmit such broadcast messages periodically until provisioning information is provided. In some examples, the device 100 may be configured such that upon receiving one or more broadcast messages from another device requesting provisioning information, the device 100 transmits the provisioning information stored in the memory 108 of the device 100 via one or more broadcast messages via the second wireless communication protocol.

In some examples, the device 100 may be configured such that after provisioning information is provided to the device 100, the device 100 connects to the wireless network using the first wireless communication protocol. In some examples, the device 100 may be configured to operate in "legacy mode" after first connecting to the wireless network. In legacy mode, the device receives operating instructions via the wireless network using the first wireless communication protocol but does not relay the operating instructions. When operating in legacy mode, the device functions in a similar way to other known devices. The device 100 may then be switched to operate in either proxy or client mode. The device 100 may switch from legacy mode into proxy/client mode in response to instructions received by a remote operator, or in response to a determination that a threshold number of devices is connected to the wireless network using the first wireless communication protocol. In some examples, the determination may be made by a remote operator or may be made by the controller 104.

An application component 102 according to the present disclosure may be any component that is configured to be operable by a remote operator via one or more operating instructions. A device comprising such a component can be referred to, in some circumstances, as an IoT device. In some examples, an application component 102 of the device 100 may be selected from a group comprising: an illumination device, a light sensor, a smart plug, an HVAC device, an actuator, a space heater, a disinfection unit, an air-purifier, an audio speaker, a video reproduction unit, a garage door opener, an alarm system, an electronic lock. Other examples of application components are also contemplated.

In some examples, the operating instructions received by the device 100 via either the first wireless communication protocol or the second wireless communication protocol each comprise a unique identifier. The unique identifier is a unique to each operating instruction. The unique identifier allows the device to differentiate between operating instructions received by the device.

In some examples where the device 100 further comprises memory 108, the controller 104 of the device 100 may be configured to store the unique identifiers of each operating instruction received by the device 100 in the memory 108 of the device 100.

In some examples where the controller 104 of the device 100 is configured to store the unique identifiers of the operating instructions, the controller 104 of the device is configured such that when an operating instruction is received by the device, the controller 104 compares the unique identifier of the operating instruction to the unique identifiers stored in the memory 108 of the device 100. This allows the controller 104 to determine whether the device 100 has previously received an operating instruction with the same unique identifier, and thus whether the operating instruction has already been received.

In some examples, if the controller 104 determines that a received operating instruction has the same unique identifier as an operating instruction received previously, the controller 104 is configured to prevent the operating instruction from being re-transmitted via one or more broadcast messages using the second wireless communication protocol. In practice, this prevents the same operating instruction from being relayed multiple times through a system comprising multiple devices. Alternatively, or additionally, the broadcast messages may be fitted with a time-to-live counter, which is decreased on every hop and no longer retransmitted when the hop-count reaches zero.

In some examples, the controller 104 of the device 100 may be configured to only store a limited number of unique identifiers in the memory 108. In such examples, the controller 104 stores the unique identifier in the memory 108 in such a way that the chronological order in which the operating instructions comprising the unique identifiers can be determined (for example by operating the memory as a FIFO). When the controller 104 determines that the pre-set number of unique identifiers stored in the memory 108 has been reached, the oldest of the unique identifiers stored in the memory 108 is removed, like a FIFO. The pre-set number of unique identifiers to be stored in the memory is determined such that repeated relaying of operating instructions with the same unique identifier is avoided, while also preventing the need for large amounts of memory 108 to be provided. Optionally, entries in the memory may also be associated with a timestamp, thereby enabling pruning/deletion of FIFO memory entries that have gone stale and are no longer relevant. To this end a predetermined maximum-in-FIFO lifetime may be used, that is used as a threshold for deletion of old FIFO memory entries.

In some examples, the operating instruction may comprise a device identifier. Such a device identifier may comprise, for example, the MAC address of the device. In such examples, the device identifier may allow for the intended recipient device(s) of the operating instruction to be identified.

In one such example, the device identifier may identify the device to which the operating instruction is intended to be delivered. In such examples, a device 100 upon receiving an operating instruction may operate the application component 102 in response to the controller 104 determining that the operating instruction comprises a device identifier corresponding to the device 100. In some examples, if the controller 104 determines that the operating instruction comprises a device identifier corresponding to the device 100, the controller 104 may prevent the device 100 from relaying the operating instruction.

In another example, the device identifier may identify the device which transmitted the operating instruction via one or more broadcast messages (referred to hear as the transmitting device). In such examples, other devices (referred to here as the receiving devices) may be configured such that upon receipt of an operating instruction comprising a device identifier corresponding to the transmitting device, the receiving devices operate their respective application components. Such an example may allow for a device to operate in groups of devices, rather than as individual devices.

In some examples, when operating in the client mode, the controller 104 may be configured to cause the device 100 to connect to the wireless network using the first wireless communication protocol in order to check for the availability of a firmware update. If the controller 104 determines that a firmware update is available, the controller 104 causes the device 100 to download and install the firmware update via the wireless network using the first wireless communication protocol. In some examples, when connected to the wireless network using the first wireless communication protocol, the device 100 may switch to operate in proxy mode or may continue to operate in client mode. If the device 100 continues to operate in client mode, the device 100 does not received operating instructions via the wireless network using the first wireless communication protocol.

The controller 104 may cause the device 100 to connect to the wireless network using the first wireless communication protocol to check for a firmware update in response to receiving an update instruction via a broadcast message received using the second wireless communication protocol. Alternatively, the controller 104 may cause the device 100 to connect to the wireless network using the first wireless communication protocol to check for a firmware update after a pre-set period of time has elapsed. The pre-set period of time may be determined from the last time the controller 104 checked for a firmware update.

In some examples, when the device 100 is operating in client mode, an operating instruction received via one or more broadcast messages received using the second wireless communication protocol may require the device 100 to connect to the wireless network using the first wireless communication protocol. This may be, for example, because the operation of the application component 102 requires use of the wireless network. In such examples, the device 100 may continue to operate in the client mode or may switch to operating in the proxy mode. In examples where the device switches to operating in the proxy mode, the controller 104 may transmit a message in order to inform the other devices connected to the wireless network to inform them that the device 100 has to connect to the wireless network in order to allow the application component 102 to use the wireless network. In such examples, the transmitted message may cause one or more of the other devices to switch from proxy mode to client mode if a determination is made that the threshold number of devices is reached. Similarly, if the device 100 is operating in proxy mode an receives a message indicating that another device previously operating in client mode needs to switch to proxy mode, the controller 104 may cause the device 100 to switch to operating in client mode if a determination is made that threshold number of devices operating in proxy mode has been reached.

In some examples the first wireless communication protocol may be any wireless networking protocol suitable for connecting the device 100 to the internet via the wireless networking protocol. In some examples, the first wireless communication protocol may be a wireless network using the IEEE 802.11 protocol. Such a wireless network may use the IEEE 802.11 protocol operating in an infrastructure mode, with one or more access points using a basic service set (BSS) or an extended service set (ESS). In some examples, the wireless network that the device 100 connects to using the first wireless communication protocol may be a wireless network formed and managed by one or more wireless access points (WAP). In such a network, the one or more WAPs form and manage the wireless network and may provide internet access to devices connected to the wireless network. A wireless network of this type is beneficial because it allows a high bandwidth connection between devices and the internet. In other examples, the first wireless communication protocol may be, for example, a Bluetooth network.

In some examples the second wireless communication protocol may be any wireless peer-to-peer protocol suitable for transmitting broadcast messages. In some examples, the second wireless communication protocol is Wi-Fi Direct based, wherein the IEE 802.11 protocol is used with the peer-to-peer extensions from Wi-Fi Direct. In some examples, the broadcast messages may be P2P Public Action Frames as defined in the Wi-Fi Direct standard. In other examples, the second wireless communication protocol may use, for example, Bluetooth, Bluetooth Low Energy or Zigbee inter-PAN broadcast messages.

In some examples, the broadcast messages and/or the operating instructions may be encrypted. Encryption may be performed by the devices and/or by the remote server 400. The devices may be configured such that only encrypted operating instructions/broadcast messages are acted upon and/or relayed. The encryption may use, for example, public-private key pair type encryption. In such an example, encryption is performed by a trusted device using the private portion of the public-private key pair. After receiving an encrypted instruction/message, the controller 104 of a device 100 can decrypt the encrypted message using the public portion of the public-private key pair. Using a public-private key pair method is beneficial because it allows for any device (whether trusted or not) to decrypt the broadcast messages, however only trusted devices can encrypt instructions/messages.

In some examples where encryption is used, the encryption method may include a time-based unique value. Such a value would allow for repeated messages to be identified, thereby preventing an unauthorized user/device from re-transmitting encrypted messages at a later date (replay-attack).

In some examples, the controller 104 may be configured such that the device 100 periodically transmits a heartbeat signal via one or more broadcast messages using the second wireless communication protocol. The device 100 uses the second wireless communication protocol to transmit and receive broadcast messages. Unlike the first wireless communication protocol, the device does not connect to a network or maintain connections with other devices using the second wireless communication protocol. Instead, the heartbeat signal may be used in order to allow devices to be aware of other devices operating within range of the broadcast messages.

In some examples, the device 100 may transmit the heartbeat signal at pre-set intervals. In some examples, the heartbeat signal may contain device identification information such that another device, upon receiving the heartbeat signal, is able to determine which device transmitted the heartbeat signal. In some examples, the device identification information may comprise the MAC address of the device transmitting the heartbeat signal.

In some examples, the heartbeat signal transmitted by the device 100 may comprise information identifying whether the device 100 is functioning in proxy mode or client mode. In some examples, when the device 100 is operating in client mode, if the device 100 does not receive a heartbeat signal from another device operating in proxy mode after a pre-determined time period, the controller 104 may switch the device 100 from operating in client mode to operating in proxy mode. In a situation where a first device operating in proxy mode ceases to function (for example, the first device could suffer a power loss or a mechanical failure), it will stop transmitting a heartbeat signal; a second device operating in client mode that was previously receiving relayed operating instructions from the first device will determine that a predetermined period of time has elapsed since the heartbeat signal from the first device was received. The second device will thereby determine that the first device is no longer functioning and so the controller of the second device may cause the second device to switch to operating in proxy mode.

In some examples, the second device may not switch to operating in proxy mode if, during the predetermined time period, the second device receives one or more heartbeat signals from a further device operating in proxy mode. In some examples, the second device will switch to operating in proxy mode only if a heartbeat signal from any other device operating in proxy mode is not received within a predetermined time period. In some examples, after determining that one or more devices operating in proxy mode have stopped transmitting a heartbeat signal, the second device may wait for a randomly determined period of time before switching to operating in proxy mode. This may be beneficial as it may prevent multiple devices operating in client mode from simultaneously switching to proxy mode, which could potentially interfere with the operation of the wireless network.

In some examples, a device 100 operating in client mode may periodically transmit a heartbeat signal via one or more broadcast messages using the second wireless communication protocol. In some examples, the heartbeat signal may be transmitted in response to receiving a heartbeat signal transmitted by a device operating in the proxy mode.

In some examples where devices operating in client mode transmit a heartbeat signal, a device 100 operating in proxy mode may, in response to receiving a heartbeat signal from another device operating in client mode, transmit information regarding the received heartbeat signal to a remote operator via the wireless network using the first wireless communication protocol. In some examples, the remote operator may be a server 400 connected to a wireless network controller 300 via a network connection and/or via the internet. In some examples, the transmitted information regarding the received heartbeat signals may allow the remote operator to determine which devices are able to receive operating instructions.

In some examples, when a device 100 is operating in proxy mode, if the controller 104 determines that the received heartbeat signals indicate that a number of other devices operating in proxy mode meets a threshold, the controller 104 may cause the device 100 to switch to operating in client mode. In some examples, after determining that the number of devices operating in proxy mode meets a threshold value, the controller 104 may wait for a randomly determined period of time before switching the device to operating in proxy client mode. This may be beneficial as it may prevent multiple devices operating in proxy mode from simultaneously switching to client mode, which could potentially interfere with the receiving of operating instructions via the wireless network using the first wireless communication protocol.

In some examples, after a device 100 is connected to the wireless network using the first connection, the device 100 may establish a connection to a remote server 400. In some examples the server may be connected to the wireless network via a further network connection and/or via the internet. In some examples, the device 100 establishes a secure connection with the server 400 using server authorization credentials. In some examples the server authorization credentials are hard coded into the device 100 when the device is manufactured. In other examples, the server authorization credentials may be configured in the device 100 at a later time, for example during or after provisioning.

In some examples the remote server 400 may be connected to the wireless network controller via a local network or via the internet. In some examples, the remote server 400 may be one or more cloud-based servers. In some examples, the remote server 400 may run a publish-subscribe network protocol, such as Message Queuing Telemetry Transport (MQTT). After establishing a connection to the remote server 400 the device may subscribe to one or more mailboxes hosted on the remote server. After subscribing to the one or more mailboxes, the device can thereby receive control messages comprising operating instructions delivered to the one or more mailboxes. The received operating instructions are then relayed to the other devices in the system as described in examples above.

In such examples, a user may indicate using, for example, a smart phone that he wishes to operate an application component 102 of a device 100. The operating instruction to operate the application component 102 is transmitted to the remote server 400, where it is transmitted in a control message to the relevant mailbox. A device 100 operating in proxy mode, subscribed to the mailbox, receives the control message comprising the operating instruction from the server 400 via the wireless network using the first wireless communication protocol. The operating instruction may then be relayed via one or more broadcast messages using the second wireless communication protocol. Using a subscription-based model such as this is advantageous as it means that even if access credentials of a device were compromised by a third-party, the third-party would only be able to receive transmitted control messages; the third-party would not be able to issue unauthorized instructions.

MQTT is a preferred messaging protocol for use by the remote server 400 to transmit operating instructions to the one or more devices 100 of the present disclosure, however other protocols may also be used. Some further examples of protocols that could be used are: Constrained Application Protocol (CoAP), Extensible Messaging and Presence Protocol (XMPP), Advanced Message Queuing Protocol (AMQP) and Data Distribution Service (DDS).

It will be appreciated that the above embodiments have been described by way of example only.

More generally, according to one aspect disclosed herein, there is provided first device for use as one of a set of devices, the first device comprising: an application component configured to be operable by a remote operator via one or more operating instructions; a controller; and a wireless interface for connecting to a wireless network using a first wireless communication protocol, and for receiving and transmitting broadcast messages using a second wireless communication protocol; the first device being configured such that, in use, it is able to function interchangeably in either a proxy mode or a client mode in order to receive operating instructions; wherein in the proxy mode, the first device is configured to connect to a wireless network using the first wireless communication protocol such that, in use, operating instructions are received via the connected wireless network using the first wireless communication protocol; wherein when switching to the client mode, the first device is configured to disassociate from the wireless network using the first wireless communication protocol; wherein in either the proxy mode or the client mode, the first device is configured such that, in use, operating instructions are received via one or more incoming broadcast messages using the second wireless communication protocol; wherein the first device is configured such that, in use, in response to receiving an operating instruction using either the first wireless communication protocol or the second wireless communication protocol, the operating instruction is transmitted onwards by the first device in one or more outgoing broadcast messages using the second wireless communication protocol; and wherein when the first device is operating in the proxy mode, the controller is configured to switch the first device to operate in the client mode in response to at least one of: a determination that a threshold number of other devices are connected to the wireless network using the first wireless communication protocol; and the first device having received, using the first wireless communication protocol, an operating instruction addressed to the first device to switch to client mode.

According to a second aspect disclosed herein there is provided a first device according to the first aspect, wherein each operating instruction comprises a unique identifier, wherein the unique identifier is unique to the operating instruction.

According to a third aspect disclosed herein there is provided a first device according to the second aspect, further comprising a memory configured to store the unique identifier of each operating instruction received by the device.

According to a fourth aspect disclosed herein there is provided a first device according to the third aspect, wherein the controller is configured such that: upon receipt of an operating instruction received in one or more broadcast messages via the second wireless communication protocol, the controller compares the unique identifier of the operating instruction to any unique identifiers previously stored in the memory; and transmit the operating instruction in one or more broadcast messages using the second wireless communication protocol only if the unique identifier of the operating instruction does not match another unique identifier previously stored in the memory.

According to a fifth aspect disclosed herein there is provided a first device according to any preceding aspect, wherein the controller is configured such that when the first device is operating in the client mode, in response to at least one of: receiving an update instruction via one or more incoming broadcast messages received using the second wireless communication protocol; and a pre-set time period elapsing since the first device disassociated from the wireless network; the controller causes the first device to connect to the wireless network using the first wireless communication protocol in order to retrieve a firmware update.

According to a sixth aspect disclosed herein there is provided a first device according to any preceding aspect, wherein the component configured to be operable by a remote operator is selected from a group consisting of: an illumination device, a light sensor, a smart plug, an HVAC device, an actuator, a space heater, a disinfection unit, an air-purifier, an audio speaker, a video reproduction unit, a garage door opener, an alarm system, an electronic lock.

According to a seventh aspect disclosed herein there is provided a first device according to any preceding aspect, wherein the first wireless communication protocol comprises an IEEE 802.11 protocol and/or a Bluetooth protocol.

According to an eighth aspect disclosed herein there is provided a first device according to any preceding aspect, wherein the second wireless communication protocol comprises a wireless peer-to-peer protocol and/or a Bluetooth protocol.

According to a ninth aspect disclosed herein there is provided a first device according to the eighth aspect, wherein the second wireless communication protocol comprises Wi-Fi Direct P2P Public Action Frames.

According to a tenth aspect disclosed herein there is provided a first device according to any preceding aspect, wherein the controller is configured such that when the first device is operating in the proxy mode, the first device transmits a first heartbeat signal via one or more broadcast messages using the second wireless communication protocol at a first interval.

According to an eleventh aspect disclosed herein there is provided a first device according to any preceding aspect, wherein the controller is configured such that when the first device is operating in the client mode, if a first heartbeat signal is not received via one or more broadcast messages using the second wireless communication protocol during a first time period, the controller switches the first device to operate in the proxy mode.

According to a twelfth aspect disclosed herein there is provided a first device according to any preceding aspect, wherein the controller is configured such that when operating in the client mode, if a first heartbeat signal is received via one or more broadcast messages using the second wireless communication protocol, the first device transmits a second heartbeat signal via one or more broadcast messages using the second wireless communication protocol, wherein the second heartbeat signal comprises a first device identifier associated with the first device.

According to a thirteenth aspect disclosed herein there is provided a first device according to any preceding aspect, wherein the controller is configured such that when the first device is operating in the proxy mode, if a second heartbeat signal comprising a second device identifier is received via one or more broadcast messages using the second wireless communication protocol, the controller of the first device stores the second device identifier.

According to a fourteenth aspect disclosed herein there is provided a method of operating a first device according to any preceding aspect, wherein: when operating in the proxy mode, the first device is connected to a wireless network using the first wireless communication protocol and operating instructions are received via the connected wireless network using the first wireless communication protocol; when switching to the client mode, the first device disassociates from the wireless network using the first wireless communication protocol; when operating in either the proxy mode or the client mode, operating instructions are received via one or more incoming broadcast messages using the second wireless communication protocol; in response to receiving an operating instruction using either the first wireless communication protocol or the second wireless communication protocol, the operating instruction is transmitted onwards by the first device in one or more outgoing broadcast messages using the second wireless communication protocol; and when the first device is operating in the proxy mode, switching the first device to operate in the client mode in response to at least one of: a determination that a threshold number of other devices are connected to the wireless network using the first wireless communication protocol; and the first device having received, using the first wireless communication protocol, an operating instruction addressed to the first device to switch to the client mode.

According to a fifteenth aspect disclosed herein there is provided a system comprising: a device according to any of claims 1 to 13 functioning in the proxy mode; and a device according to any of claims 1 to 13 functioning in the client mode; wherein, in use: the device operating in the proxy mode receives an operating instruction via the connected wireless network using the first wireless communication protocol and, in response to receiving the operating instruction, transmits the operating instruction onwards in one or more outgoing broadcast messages via the second wireless communication protocol; the device operating in the client mode receives, via the second wireless communication protocol, one or more incoming broadcast messages, the one or more incoming broadcast messages corresponding to the one or more outgoing broadcast messages comprising the operating instruction broadcast by the first device via the second wireless communication protocol; and the device operating in the client mode, in response to receiving the operating instruction, transmits the operating instruction onwards in one or more outgoing broadcast messages via the second wireless communication protocol.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A lighting device for use as one of a set of devices, the lighting device comprising:

an application component configured to be operable by a remote operator via one or more operating instructions, the application component for use on-premises in lighting application;

a controller comprising a processor; and a wireless interface for connecting to a wireless network using a first wireless communication protocol, and for receiving and transmitting broadcast messages using a second wireless communication protocol, the first wireless communication protocol comprises an IEEE 802.11 protocol;

the lighting device being configured such that, in use, it is able to function interchangeably in either a proxy mode or a client mode in order to receive operating instructions;

wherein in the proxy mode, the lighting device is configured to connect to a wireless network using the first wireless communication protocol such that, in use, operating instructions are received via the connected wireless network using the first wireless communication protocol;

wherein when switching to the client mode, the lighting device is configured to disassociate from the wireless network using the first wireless communication protocol;

wherein when operating in the proxy mode and when operating in the client mode, the lighting device is configured such that, in use, operating instructions are received via one or more incoming broadcast messages using the second wireless communication protocol;

wherein the lighting device is configured such that, in use, in response to receiving an operating instruction using the first wireless communication protocol, the operating instruction is transmitted onwards by the lighting device in one or more outgoing broadcast messages using the second wireless communication protocol;

and wherein the lighting device is configured such that, in use, in response to receiving an operating instruction using the second wireless communication protocol, the operating instruction is transmitted onwards by the lighting device in one or more outgoing broadcast messages using the second wireless communication protocol; and wherein when the lighting device is operating in the proxy mode, the controller is configured to switch the lighting device to operate in the client mode in response to a determination that a threshold number of other devices are connected to the wireless network using the first wireless communication protocol.

2. A lighting device for use as one of a set of devices, the lighting device comprising:

an application component configured to be operable by a remote operator via one or more operating instructions, the application component for use on-premises in lighting application;

a controller comprising a processor; and a wireless interface for connecting to a wireless network using a first wireless communication protocol, and for receiving and transmitting broadcast messages using a second wireless communication protocol, the first wireless communication protocol comprises an IEEE 802.11 protocol;

the lighting device being configured such that, in use, it is able to function interchangeably in either a proxy mode or a client mode in order to receive operating instructions;

wherein in the proxy mode, the lighting device is configured to connect to a wireless network using the first wireless communication protocol such that, in use, operating instructions are received via the connected wireless network using the first wireless communication protocol;

wherein when switching to the client mode, the lighting device is configured to disassociate from the wireless network using the first wireless communication protocol;

wherein when operating in the proxy mode and when operating in the client mode, the lighting device is configured such that, in use, operating instructions are received via one or more incoming broadcast messages using the second wireless communication protocol;

wherein the lighting device is configured such that, in use, in response to receiving an operating instruction using the first wireless communication protocol, the operating instruction is transmitted onwards by the lighting device in one or more outgoing broadcast messages using the second wireless communication protocol;

wherein the lighting device is configured such that, in use, in response to receiving an operating instruction using the second wireless communication protocol, the operating instruction is transmitted onwards by the first device in one or more outgoing broadcast messages using the second wireless communication protocol; and wherein when the lighting device is operating in the proxy mode, the controller is configured to switch the lighting device to operate in the client mode in response to the lighting device having received, using the first wireless communication protocol, an operating instruction addressed to the lighting device to switch to client mode.

3. The lighting device according to claim 1, wherein each operating instruction comprises a unique identifier, wherein the unique identifier is unique to the operating instruction.

4. The lighting device according to claim 3, further comprising a memory configured to store the unique identifier of each operating instruction received by the device or the unique identifiers of up to the last N received operating instructions, where N is a predetermined integer.

5. The lighting device according to claim 4, wherein the controller is configured such that: upon receipt of an operating instruction received in one or more broadcast messages via the second wireless communication protocol, the controller compares the unique identifier of the operating instruction to any unique identifiers previously stored in the memory; and transmit the operating instruction in one or more broadcast messages using the second wireless communication protocol only if the unique identifier of the operating instruction does not match another unique identifier previously stored in the memory.

6. The lighting device according to claim 1, wherein the controller is configured such that when the lighting device is operating in the client mode, in response to at least one of:

receiving an update instruction via one or more incoming broadcast messages received using the second wireless communication protocol; and a pre-set time period elapsing since the lighting device disassociated from the wireless network;

the controller causes the lighting device to connect to the wireless network using the first wireless communication protocol in order to retrieve a firmware update.

7. The lighting device according to claim 1, wherein the application component configured to be operable by a remote operator is selected from a group consisting of: an illumination device, a light sensor.

8. The lighting device according to claim 1, wherein the second wireless communication protocol comprises a wireless peer-to-peer protocol and/or a Bluetooth protocol.

9. The lighting device according to claim 8, wherein the second wireless communication protocol comprises Wi-Fi Direct P2P Public Action Frames.

10. The lighting device according to claim 1, wherein the controller is configured such that when the lighting device is operating in the proxy mode, the lighting device transmits a first heartbeat signal via one or more broadcast messages using the second wireless communication protocol at a first interval.

11. The lighting device according to claim 1, wherein the controller is configured such that when the lighting device is operating in the client mode, if a first heartbeat signal is not received via one or more broadcast messages using the second wireless communication protocol during a first time period, the controller switches the lighting device to operate in the proxy mode.

12. The lighting device according to claim 1, wherein the controller is configured such that when operating in the client mode, if a first heartbeat signal is received via one or more broadcast messages using the second wireless communication protocol, the lighting device transmits a second heartbeat signal via one or more broadcast messages using the second wireless communication protocol, wherein the second heartbeat signal comprises a lighting device identifier associated with the lighting device.

13. The lighting device according to claim 1, wherein the controller is configured such that when the lighting device is operating in the proxy mode, if a second heartbeat signal comprising a second device identifier is received via one or more broadcast messages using the second wireless communication protocol, the controller of the lighting device stores the second device identifier.

14. A method of operating a lighting device, the method comprising:

when operating in a proxy mode, a lighting device is connected to a wireless network using a first wireless communication protocol and operating instructions are received via a connected wireless network using the first wireless communication protocol, wherein the lighting device comprises:

an application component configured to be operable by a remote operator via one or more operating instructions, the application component for use on-premises in a lighting application a controller; and a wireless interface for connecting to a wireless network using the first wireless communication protocol, and for receiving and transmitting broadcast messages using a second wireless communication protocol, the first wireless communication protocol comprises an IEEE 802.11 protocol;

when switching to a client mode, the lighting device disassociates from the wireless network using the first wireless communication protocol;

when operating in the proxy mode and when operating in the client mode, operating instructions are received via one or more incoming broadcast messages using the second wireless communication protocol;

in response to receiving an operating instruction using the first wireless communication protocol, the operating instruction is transmitted onwards by the lighting device in one or more outgoing broadcast messages using the second wireless communication protocol;

in response to receiving an operating instruction using the second wireless communication protocol, the operating instruction is transmitted onwards by the lighting device in one or more outgoing broadcast messages using the second wireless communication protocol; and when the lighting device is operating in the proxy mode, switching the lighting device to operate in the client mode in response to a determination that a threshold number of other devices are connected to the wireless network using the first wireless communication protocol.

15. The method of operating a lighting device according to claim 14 comprising:

when the first device is operating in the proxy mode, switching the first device to operate in the client mode in response to the first device having received, using the first wireless communication protocol, an operating instruction addressed to the first device to switch to the client mode.

\* \* \* \* \*